(12) United States Patent
Hile et al.

(10) Patent No.: US 12,156,069 B2
(45) Date of Patent: Nov. 26, 2024

(54) PEER-TO-PEER DATA SHARING FOR REDUCED NETWORK DEMAND

(71) Applicant: The Boeing Company, Chicago, IL (US)

(72) Inventors: Jessica Lyn Hile, Austin, TX (US); Alyssa Ambos, Austin, TX (US); Ryan P. McBride, Chicago, IL (US)

(73) Assignee: The Boeing Company, Arlington, VA (US)

( * ) Notice: Subject to any disclaimer, the term of this patent is extended or adjusted under 35 U.S.C. 154(b) by 155 days.

(21) Appl. No.: 17/452,691

(22) Filed: Oct. 28, 2021

(65) Prior Publication Data
US 2023/0140819 A1    May 4, 2023

(51) Int. Cl.
*H04W 28/02* (2009.01)
*H04W 4/08* (2009.01)
*H04W 84/12* (2009.01)

(52) U.S. Cl.
CPC .......... *H04W 28/021* (2013.01); *H04W 4/08* (2013.01); *H04W 84/12* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2007/0297426 A1* | 12/2007 | Haveson | ................. | H04L 45/00 370/465 |
| 2013/0060616 A1* | 3/2013 | Block | ................. | G06Q 30/0601 726/28 |
| 2014/0115096 A1* | 4/2014 | Burba | ................... | H04L 67/535 709/217 |
| 2014/0172602 A1* | 6/2014 | Beddow | ............... | G06Q 20/123 705/21 |
| 2018/0027070 A1* | 1/2018 | Jhanji | ................. | H04L 67/1091 709/217 |

\* cited by examiner

*Primary Examiner* — Gary Mui
*Assistant Examiner* — Hooman Houshmand
(74) *Attorney, Agent, or Firm* — Alleman Hall & Tuttle LLP

(57) ABSTRACT

A method of acquiring digital content by a user device is provided. The user device is connected to a wireless local area network (WLAN) that is connected to a wider-area network over which the digital content is accessible from a server computer. The method includes receiving a request for the digital content at the user device, and performing a search of a peer-to-peer network that includes the user device a peer device running client software from which the peer-to-peer network is accessible. The search is performed to determine if the digital content is also accessible from the peer device. And the digital content is accessed from the peer device over the peer-to-peer network when the digital content is also accessible from the peer device, and from the server computer over the WLAN and the wider-area network when the digital content is inaccessible from the peer device.

21 Claims, 7 Drawing Sheets

PEER-TO-PEER DATA SHARING FOR REDUCED NETWORK DEMAND

TECHNOLOGICAL FIELD

The present disclosure relates generally to computer network communication and, in particular, to peer-to-peer data sharing for reduced network demand.

BACKGROUND

Broadband communication access, on which our society and economy is growing increasingly dependent, has generally not been readily available to users in environments such as commercial transportation onboard vehicles such as aircraft. While the technology exists to deliver the broadband communication services in these environments, the bandwidth costs are typically higher and the data rates are typically lower. One obstacle limiting these broadband services has been the limited availability of bandwidth that is governed by various governing bodies around the globe.

In the commercial transportation industry, the higher cost and lower data rates of broadband communication services has been particularly impactful to those who cannot avoid their use. Passengers who may only occasionally use an onboard broadband communication service may simply avoid its use during their travel. This may not be as practical for crew members who may need to access certain digital content over broadband during a flight. The pilots of an aircraft, for example, may have need to access current weather data during flight as the weather may impact flight operations.

It would therefore be desirable to have a system and method that takes into account at least some of the issues discussed above, as well as other possible issues.

BRIEF SUMMARY

Example implementations of the present disclosure are directed to computer network communication and, in particular, to peer-to-peer data sharing for reduced network demand. Example implementations are built on the recognition that there may be overlap in the types of digital content that certain users such as crew members in commercial transportation may request on a given trip. Certain user devices in radio range of one another, then, may establish a peer-to-peer network from which a request for digital content may be served, without reaching out to a server computer across a wireless local area network (WLAN) and a wider-area network such as the Internet. Example implementations promote the sharing of digital content using the peer-to-peer network before requesting the digital content from the server computer, saving both bandwidth cost and time in acquiring the digital content at an otherwise lower data rate.

The present disclosure thus includes, without limitation, the following example implementations.

Some example implementations provide an apparatus for acquiring digital content by a user device connected to a WLAN that is connected to a wider-area network over which the digital content is accessible from a server computer, the apparatus comprising: a memory configured to store computer-readable program code; and processing circuitry configured to access the memory, and execute the computer-readable program code to cause the apparatus to at least: receive a request for the digital content at the user device; perform a search of a peer-to-peer network that includes the user device and one or more peer devices running client software from which the peer-to-peer network is accessible, the search performed to determine if the digital content is also accessible from a peer device of the one or more peer devices; and access the digital content from the peer device over the peer-to-peer network and independent of the wider-area network when the search indicates the digital content is also accessible from the peer device, and from the server computer over the WLAN and the wider-area network when the search indicates the digital content is inaccessible from the peer device.

Some example implementations provide a method of acquiring digital content by a user device connected to a wireless local area network (WLAN) that is connected to a wider-area network over which the digital content is accessible from a server computer, the method comprising: receiving a request for the digital content at the user device; performing a search of a peer-to-peer network that includes the user device and one or more peer devices running client software from which the peer-to-peer network is accessible, the search performed to determine if the digital content is also accessible from a peer device of the one or more peer devices; and accessing the digital content from the peer device over the peer-to-peer network and independent of the wider-area network when the search indicates the digital content is also accessible from the peer device, and from the server computer over the WLAN and the wider-area network when the search indicates the digital content is inaccessible from the peer device.

Some example implementations provide a computer-readable storage medium for acquiring digital content by a user device connected to a wireless local area network (WLAN) that is connected to a wider-area network over which the digital content is accessible from a server computer, the computer-readable storage medium being non-transitory and having computer-readable program code stored therein that, in response to execution by processing circuitry, causes an apparatus to at least: receive a request for the digital content at the user device; perform a search of a peer-to-peer network that includes the user device and one or more peer devices running client software from which the peer-to-peer network is accessible, the search performed to determine if the digital content is also accessible from a peer device of the one or more peer devices; and access the digital content from the peer device over the peer-to-peer network and independent of the wider-area network when the search indicates the digital content is also accessible from the peer device, and from the server computer over the WLAN and the wider-area network when the search indicates the digital content is inaccessible from the peer device.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 4A:
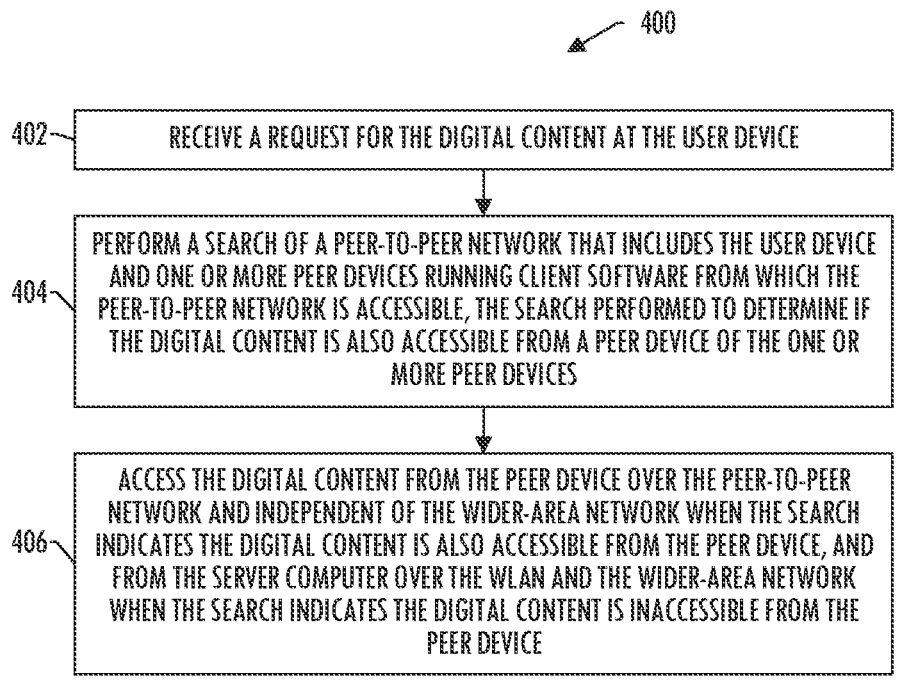
FIG. 4A is a flowchart illustrating a first step in a method of acquiring digital content by a user device connected to a wireless local area network (WLAN) that is connected to a wider-area network over which the digital content is accessible from a server computer, according to example implementations.
Figure 4B:
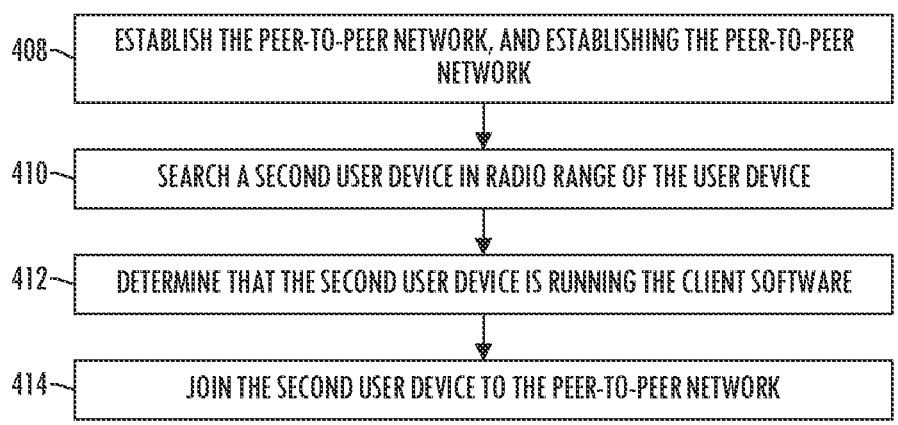
FIG. 4B is a flowchart illustrating an optional second step in a method of acquiring digital content by a user device connected to a WLAN that is connected to a wider-area network over which the digital content is accessible from a server computer, according to example implementations.
Figure 4C:
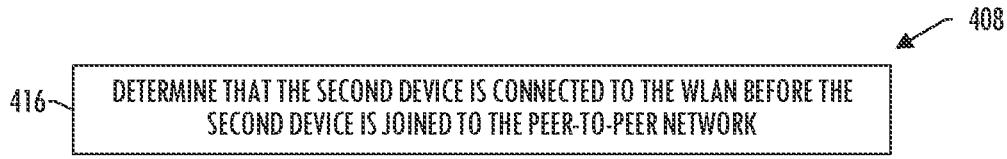
FIG. 4C is a flowchart illustrating an optional third step in a method of acquiring digital content by a user device connected to a WLAN that is connected to a wider-area network over which the digital content is accessible from a server computer, according to example implementations.
Figure 4D:
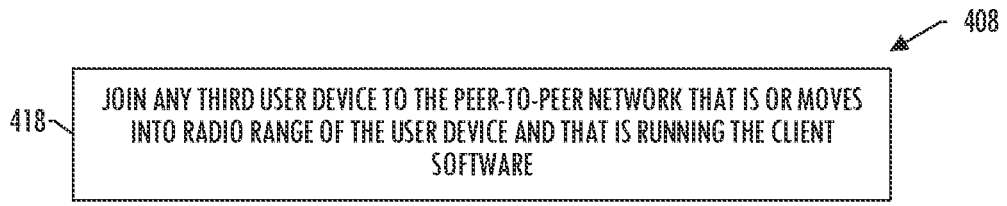
FIG. 4D is a flowchart illustrating an optional fourth step in a method of acquiring digital content by a user device connected to a WLAN that is connected to a wider-area network over which the digital content is accessible from a server computer, according to example implementations.
Figure 4E:
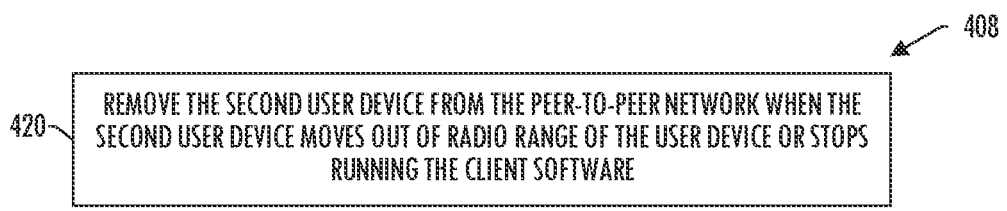
FIG. 4E is a flowchart illustrating an optional fifth step in a method of acquiring digital content by a user device connected to a WLAN that is connected to a wider-area network over which the digital content is accessible from a server computer, according to example implementations.
Figure 4F:
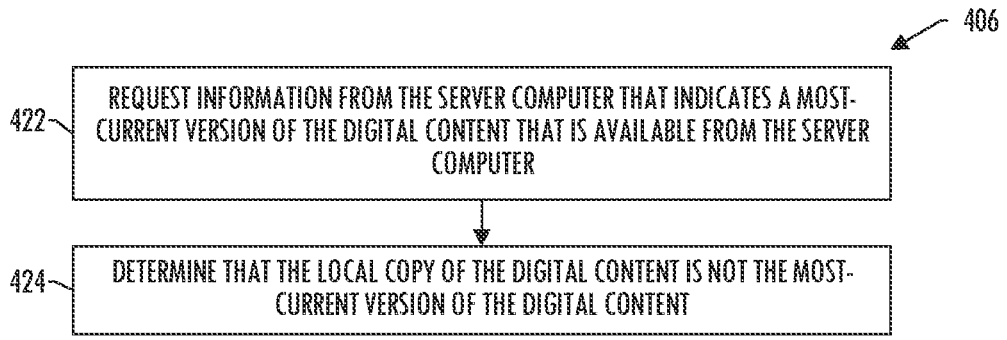
FIG. 4F is a flowchart illustrating an optional sixth step in a method of acquiring digital content by a user device connected to a WLAN that is connected to a wider-area network over which the digital content is accessible from a server computer, according to example implementations.
Figure 4G:
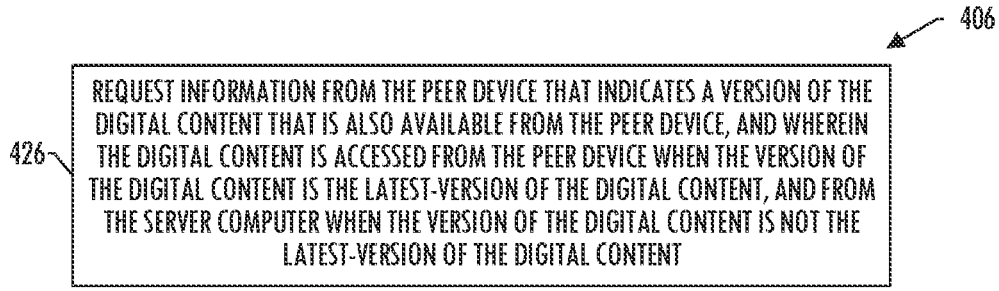
Figure 4H:
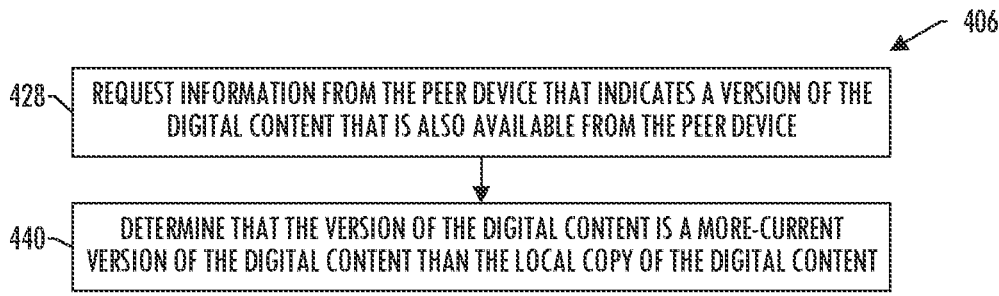
Figure 5:
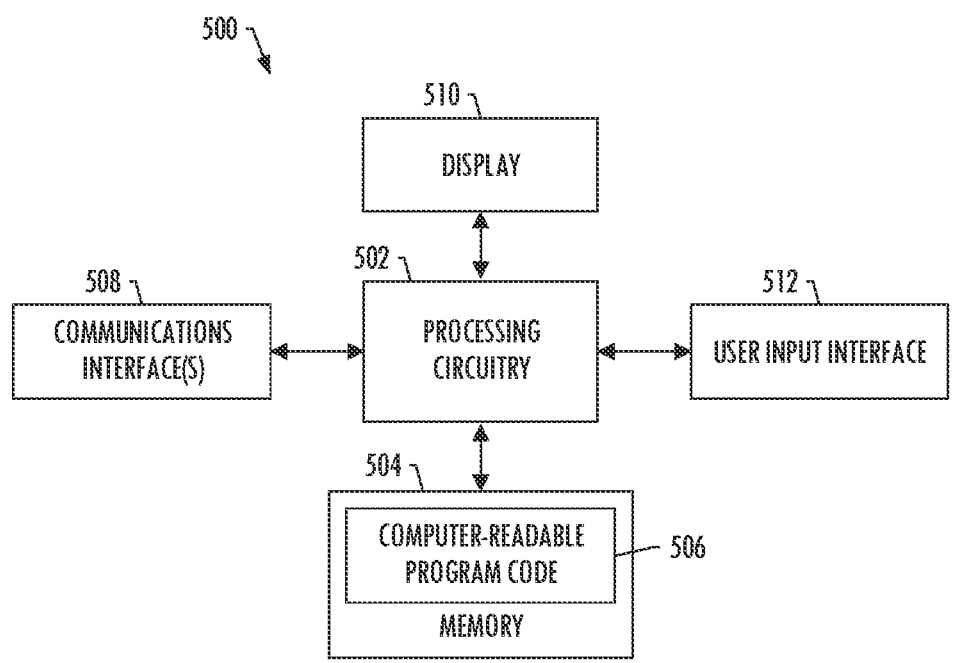

FIG. 4G is a flowchart illustrating an optional seventh step in a method of acquiring digital content by a user device connected to a WLAN that is connected to a wider-area network over which the digital content is accessible from a server computer, according to example implementations; and FIG. 4H is a flowchart illustrating an optional eighth step in a method of acquiring digital content by a user device connected to a WLAN that is connected to a wider-area network over which the digital content is accessible from a server computer, according to example implementations; and FIG. 5 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to computer network communication and, in particular, to peer-to-peer data sharing for reduced network demand. Example implementations may be applied to computer networks in a number of different environments. Examples of suitable environments include vehicles (e.g., motor vehicles, railed vehicles, watercraft, aircraft, spacecraft, etc.), office buildings, homes, stadiums, or the like. Example implementations are particularly useful in environments that include a wireless local area network (WLAN), and that additionally include at least one wireless communication link from the WLAN to a wider-area network such as the Internet from which digital content is accessible from server computers.

Figure 1:
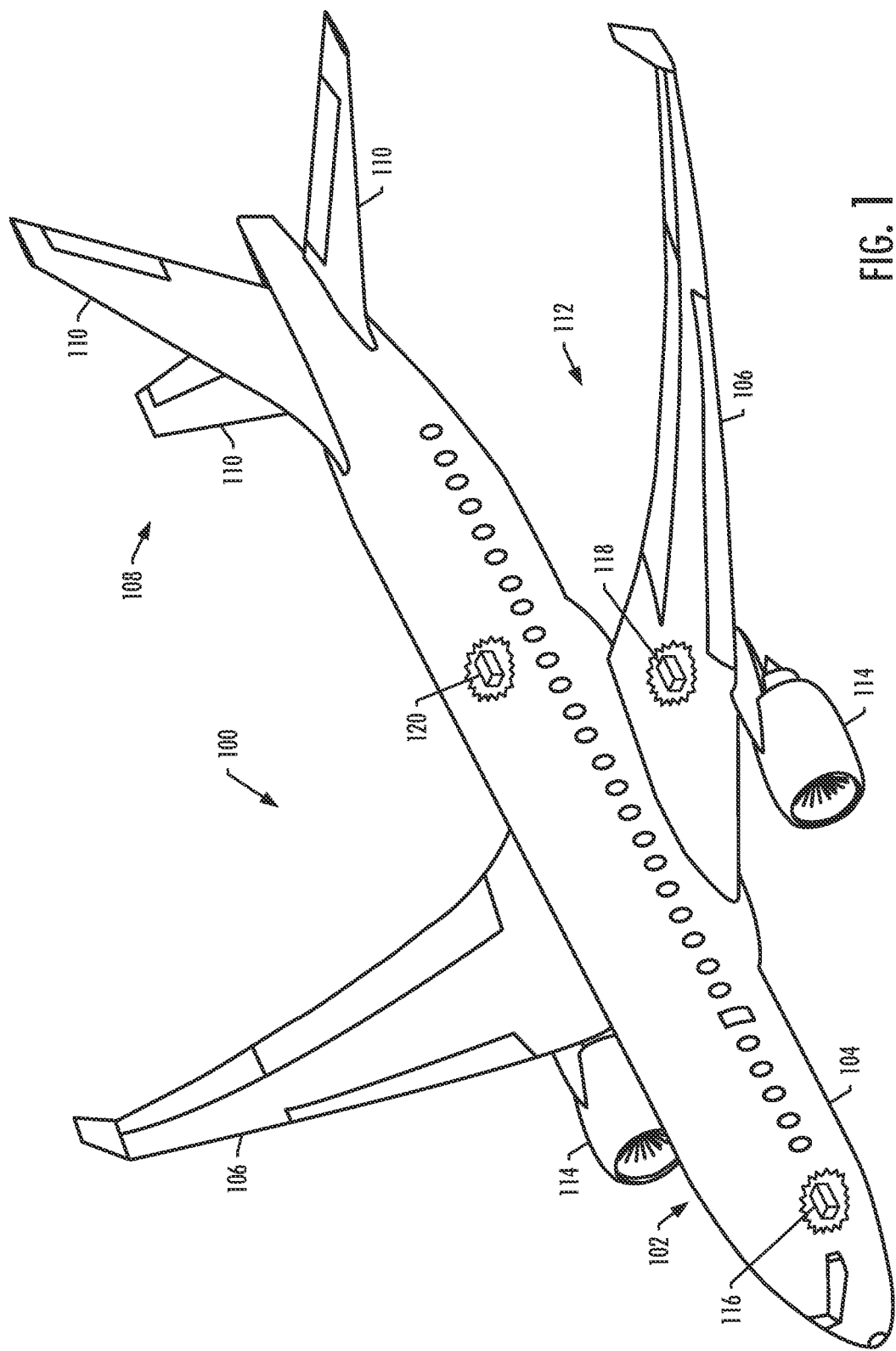
FIG. 1 illustrates one type of vehicle, namely, an aircraft that may benefit from example implementations of the present disclosure.

FIG. 1 illustrates one type of environment, namely, an aircraft 100 that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two wing-mounted engines 114 configured to power propulsors to generate propulsive forces that cause the aircraft to move. In other implementations, the propulsion system can include other arrangements, for example, engines carried by other portions of the aircraft including the fuselage and/or the tail. As also shown, the high-level systems may also include an electrical system 116, hydraulic system 118 and/or environmental system 120. Any number of other systems may be included.

Figure 2:
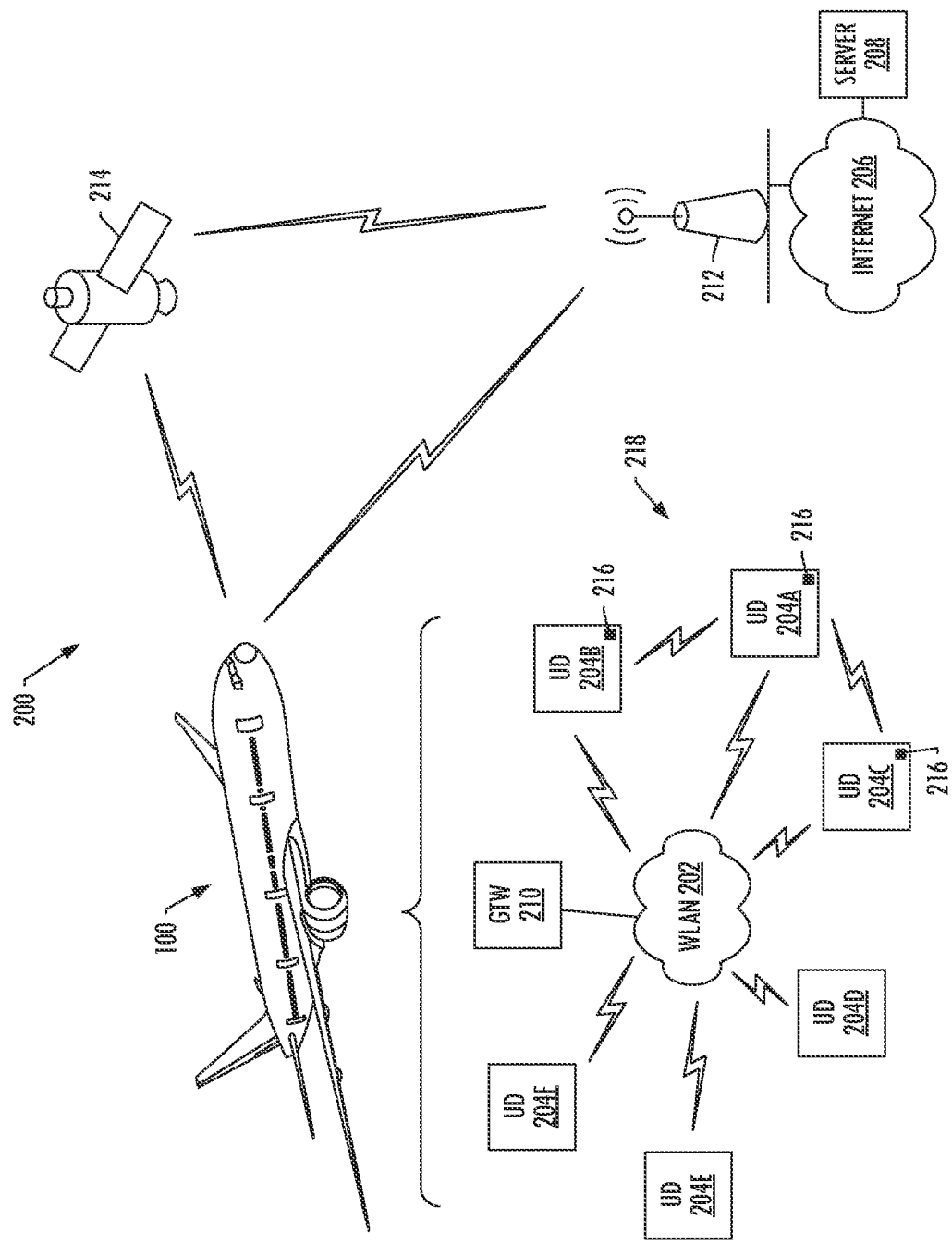
FIG. 2 illustrates an aircraft manufacturing and service method, according to some example implementations.

FIG. 2 illustrates one example of a network system 200, according to some example implementations of the present disclosure. The network system may include one or more of each of a number of components. As shown, for example, the network system includes a number of computer networks such as a wireless local area network (WLAN) 202 in an environment. In some examples, the WLAN is onboard a vehicle such as the aircraft 100. As also shown, a number of user devices 204A, 204B, 204C, 204D, 204E, 204F are connected to the WLAN, which is in turn connected to a wider-area network such as the Internet 206 from which digital content is accessible from a server computer 208.

The computer networks including the WLAN 202 and the Internet 206 include a number of computers and even smaller-scale computer networks that are interconnected by a variety of different networking hardware such as routers, switches, gateways and the like. As shown, for example, the WLAN and the Internet may be interconnected by a gateway 210 connected to the WLAN, and a ground station 212 connected to the Internet. In some examples, the network system 200 further includes a satellite 214 that interconnects the gateway and ground station, and thereby the WLAN and the Internet. The WLAN and the Internet may be interconnected in any of a number of different manners, but example implementations of the present disclosure may be more useful when interconnection between the WLAN and the Internet (or other wider-area network) includes at least one wireless communication link.

According to example implementations of the present disclosure, a user device 204A is connected to a WLAN 202 that is connected to a wider-area network such as the Internet 206 over which digital content is accessible from a server computer 208. The user device is configured to run client software 216, and establish a peer-to-peer network 218 with one or more peer devices 204B, 204C that are also run the client software from which the peer-to-peer network is accessible. In some examples, the peer-to-peer network is a wireless ad hoc network over which the user device and the one or more peer devices communicate independent of the WLAN 202. In some examples in which the WLAN is onboard a vehicle, the user device and the one or more peer devices are user devices accessible to crew members of the vehicle, such as electronic flight bags (EFBs) accessible to flight crew of the aircraft 100.

In some examples in which the user device 204A is configured to establish the peer-to-peer network 218, the user device is configured to search a second user device 204B in radio range of the user device. The user device is configured to determine that the second user device is running the client software 218, and join the second user device to the peer-to-peer network. In some further examples, the WLAN 202 is a secured network accessible to clients that are authorized to access the digital content, and the user device is further configured to determine that the second user device is connected to the WLAN 202 before the second user device is joined to the peer-to-peer network.

The peer-to-peer network 218 may established and reestablished or otherwise updated in which peer devices may be removed and others may be added based on factors such as their radio range of the user device 204A, their running the client software 216, their connection to the WLAN 202 or the like. In this regard, the user device 204A may be configured to join any third user device 204C to the peer-to-peer network that is or moves into radio range of the user device and that is running the client software 216. Likewise, the user device may remove the second user device 204B from the peer-to-peer network when the second user device moves out of radio range of the user device or stops running the client software 216.

The user device 204A is configured to receive a request for digital content, such as from a user at a user interface of the client software 216 running on user device. In some examples, the request may be automatically triggered by the client software running on user device. The user device is configured to perform a search of the peer-to-peer network 218 to determine if the digital content is also accessible from a peer device 204B of the one or more peer devices 204B, 204C. The user device, then, is configured to access the digital content from the peer device over the peer-to-peer network and independent of the wider-area network (e.g., Internet 206) when the search indicates the digital content is also accessible from the peer device. Otherwise, the user device is configured to access the digital content from the server computer 208 over the WLAN 202 and the wider-area network when the search indicates the digital content is inaccessible from the peer device.

In some examples, the user device 204A has a local copy of the digital content when the request is received. In some of these examples, the user device is configured to request information from the server computer 208 that indicates a most-current version of the digital content that is available from the server computer. The request for the digital content may be fulfilled with the local copy when the local copy is the most-current version; otherwise, the user device may determine that the local copy of the digital content is not the most-current version of the digital content, and access the digital content from the peer device 204B or the server computer as provided above.

In some examples in which the digital content is also available from the peer device 204B, the user device 204A is further configured to request information from the peer device that indicates a version of the digital content that is also available from the peer device. In some of these examples, the digital content is accessed from the peer device when the version of the digital content is a latest-version of the digital content, and from the server computer 208 when the version of the digital content is not the latest-version of the digital content.

In some examples, the user device 204A has a local copy of the digital content when the request is received, and the digital content is also available from the peer device 204B. In some of these examples, and the user device is configured to request information from the peer device that indicates a version of the digital content that is also available from the peer device. The request for the digital content may then be fulfilled with the local copy when the local copy is a more-current version than the version available from the peer device; otherwise, the user device may determine that the version of the digital content from the peer device is the more-current version of the digital content than the local copy of the digital content, and access the digital content from the peer device 204B.

Figure 3:
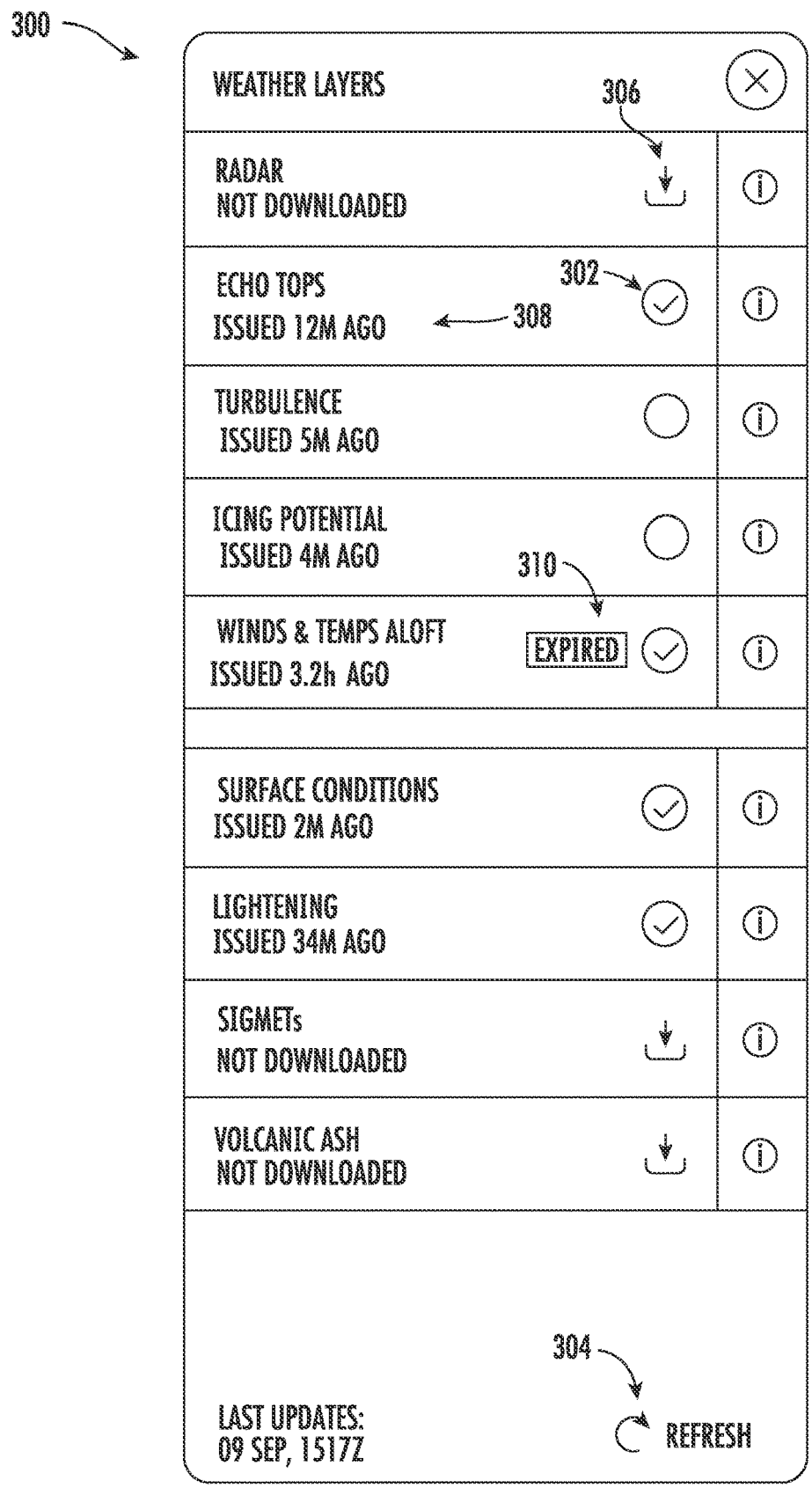
FIG. 3 illustrates a graphical user interface of client software at which a request for digital content may be received, according to some example implementations.

FIG. 3 illustrates a graphical user interface (GUI) 300 of client software 216 at which a request for digital content may be received, according to some example implementations. The GUI indicates a number of layers of weather data that may be requested, as well as a number of graphical control elements to enable a user to request the weather data.

These graphical control elements include a first graphical control element 302 to select weather data for which the user device 204A has a local copy that may be refreshed using a second graphical control element 304, and a third graphical control element 306 for which the user device does not have a local copy. The GUI may further include information 308 that for local copies of the weather data, indicates how long ago the digital content was made available at the server computer 208; and may further include information 310 that indicates some weather data has expired.

FIGS. 4A-4H are flowcharts illustrating various steps in a method 400 of acquiring digital content by a user device 204A connected to a WLAN 202 that is connected to a wider-area network over which the digital content is accessible from a server computer 208, according to various example implementations of the present disclosure. The method includes receiving a request for the digital content at the user device, as shown at block 402 of FIG. 4A. The method includes performing a search of a peer-to-peer network that includes the user device and one or more peer devices running client software 216 from which the peer-to-peer network is accessible, the search performed to determine if the digital content is also accessible from a peer device of the one or more peer devices, as shown at block 404. And the method includes accessing the digital content from the peer device over the peer-to-peer network and independent of the wider-area network when the search indicates the digital content is also accessible from the peer device, and from the server computer over the WLAN and the wider-area network when the search indicates the digital content is inaccessible from the peer device, as shown at block 406.

In some examples, the request is received at block 402 from a user at a user interface of the client software 216 running on user device, or automatically triggered by the client software running on user device.

In some examples, the digital content is accessed at block 406 from the peer-to-peer network that is a wireless ad hoc network over which the user device 204A and the one or more peer devices communicate independent of the WLAN 202.

In some examples, the method 400 further includes establishing the peer-to-peer network, as shown at block 408 of FIG. 4B. In some of these examples, establishing the peer-to-peer network includes searching a second user device in radio range of the user device, as shown at block 410. The method includes determining that the second user device is running the client software 216, as shown at block 412. And the method includes joining the second user device to the peer-to-peer network, as shown at block 414.

In some examples, the WLAN 202 is a secured network accessible to clients that are authorized to access the digital content, and establishing the peer-to-peer network at block 408 further includes determining that the second user device is connected to the WLAN before the second user device is joined to the peer-to-peer network, as shown at block 416 of FIG. 4C.

In some examples, establishing the peer-to-peer network at block 408 further includes joining any third user device to the peer-to-peer network that is or moves into radio range of the user device and that is running the client software 216, as shown at block 418 of FIG. 4D.

In some examples, establishing the peer-to-peer network at block 408 further includes removing the second user device from the peer-to-peer network when the second user device moves out of radio range of the user device or stops running the client software 216, as shown at block 420 of FIG. 4E.

In some examples, the user device 204A has a local copy of the digital content when the request is received, and accessing the digital content at block 406 further includes requesting information from the server computer 208 that indicates a most-current version of the digital content that is available from the server computer, as shown at block 422 of FIG. 4F. In some of these examples, the method includes determining that the local copy of the digital content is not the most-current version of the digital content, as shown at block 424.

In some examples, the digital content is also available from the peer device, and accessing the digital content at block 406 further includes requesting information from the peer device that indicates a version of the digital content that is also available from the peer device, as shown at block 426 of FIG. 4G. In some of these examples, the digital content is accessed from the peer device when the version of the digital content is a latest-version of the digital content, and from the server computer 208 when the version of the digital content is not the latest-version of the digital content.

In some examples, the user device 204A has a local copy of the digital content when the request is received, the digital content is also available from the peer device, and accessing the digital content at block 406 further includes requesting information from the peer device that indicates a version of the digital content that is also available from the peer device, as shown at block 428 of FIG. 4H. And the method includes determining that the version of the digital content is a more-current version of the digital content than the local copy of the digital content, as shown at block 440.

In some examples, the WLAN 202 is onboard a vehicle, and the user device 204A and the one or more peer devices are user devices accessible to crew members of the vehicle. And in some examples, the vehicle is an aircraft, and the user devices include electronic flight bags (EFBs) accessible to flight crew of the aircraft.

According to example implementations of the present disclosure, the network system 200 and its subsystems or components including the user devices 204A, 204B, 204C, 204D, 204E, 204F may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 5 illustrates an apparatus 500 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 502 (e.g., processor unit) connected to a memory 504 (e.g., storage device).

The processing circuitry 502 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 504 (of the same or another apparatus).

The processing circuitry 502 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 504, the processing circuitry 502 may also be connected to one or more interfaces for displaying, transmitting and/or receiving information. The interfaces may include a communications interface 508 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 500 may include a processing circuitry 502 and a computer-readable storage medium or memory 504 coupled to the processing circuitry, where the processing circuitry is configured to execute computer-readable program code 506 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for acquiring digital content by a user device connected to a wireless local area network (WLAN) that is connected to a wider-area network over which the digital content is accessible from a server computer, the apparatus comprising: a memory configured to store computer-readable program code; and processing circuitry configured to access the memory, and execute the computer-readable program code to cause the apparatus to at least: receive a request for the digital content at the user device; perform a search of a peer-to-peer network that includes the user device and one or more peer devices running client software from which the peer-to-peer network is accessible, the search performed to determine if the digital content is also accessible from a peer device of the one or more peer devices; and access the digital content from the peer device over the peer-to-peer network and independent of the wider-area network when the search indicates the digital content is also accessible from the peer device, and from the server computer over the WLAN and the wider-area network when the search indicates the digital content is inaccessible from the peer device.

Clause 2. The apparatus of clause 1, wherein the request is received from a user at a user interface of the client software running on user device, or automatically triggered by the client software running on user device.

Clause 4. The apparatus of clause 1 or clause 2, wherein the digital content is accessed from the peer-to-peer network that is a wireless ad hoc network over which the user device and the one or more peer devices communicate independent of the WLAN.

Clause 4. The apparatus of any of clauses 1 to 4, wherein the processing circuitry is configured to execute the computer-readable program code to cause the apparatus to further establish the peer-to-peer network, and establishing the peer-to-peer network includes: search a second user device in radio range of the user device; determine that the second user device is running the client software; and join the second user device to the peer-to-peer network.

Clause 5. The apparatus of clause 4, wherein the WLAN is a secured network accessible to clients that are authorized to access the digital content, and establishing the peer-to-peer network further includes determining that the second user device is connected to the WLAN before the second user device is joined to the peer-to-peer network.

Clause 6. The apparatus of clause 4 or clause 5, wherein establishing the peer-to-peer network further includes joining any third user device to the peer-to-peer network that is or moves into radio range of the user device and that is running the client software.

Clause 7. The apparatus of any of clauses 4 to 6, wherein establishing the peer-to-peer network further includes removing the second user device from the peer-to-peer network when the second user device moves out of radio range of the user device or stops running the client software.

Clause 8. The apparatus of any of clauses 1 to 7, wherein the user device has a local copy of the digital content when the request is received, and the apparatus caused to access the digital content further includes the apparatus caused to: request information from the server computer that indicates a most-current version of the digital content that is available from the server computer; and determine that the local copy of the digital content is not the most-current version of the digital content.

Clause 9. The apparatus of clause 8, wherein the digital content is also available from the peer device, and the apparatus caused to access the digital content further includes the apparatus caused to request information from the peer device that indicates a version of the digital content that is also available from the peer device, and wherein the digital content is accessed from the peer device when the version of the digital content is a latest-version of the digital content, and from the server computer when the version of the digital content is not the latest-version of the digital content.

Clause 10. The apparatus of any of clauses 1 to 9, wherein the user device has a local copy of the digital content when the request is received, the digital content is also available from the peer device, and the apparatus caused to access the digital content further includes the apparatus caused to: request information from the peer device that indicates a version of the digital content that is also available from the peer device; and determine that the version of the digital content is a more-current version of the digital content than the local copy of the digital content.

Clause 11. The apparatus of any of clauses 1 to 10, wherein the WLAN is onboard a vehicle, and the user device and the one or more peer devices are user devices accessible to crew members of the vehicle.

Clause 12. The apparatus of clause 11, wherein the vehicle is an aircraft, and the user devices include electronic flight bags (EFBs) accessible to flight crew of the aircraft.

Clause 14. A method of acquiring digital content by a user device connected to a wireless local area network (WLAN) that is connected to a wider-area network over which the digital content is accessible from a server computer, the method comprising: receiving a request for the digital content at the user device; performing a search of a peer-to-peer network that includes the user device and one or more peer devices running client software from which the peer-to-peer network is accessible, the search performed to determine if the digital content is also accessible from a peer device of the one or more peer devices; and accessing the digital content from the peer device over the peer-to-peer network and independent of the wider-area network when the search indicates the digital content is also accessible from the peer device, and from the server computer over the WLAN and the wider-area network when the search indicates the digital content is inaccessible from the peer device.

Clause 14. The method of clause 14, wherein the request is received from a user at a user interface of the client software running on user device, or automatically triggered by the client software running on user device.

Clause 15. The method of clause 14 or clause 14, wherein the digital content is accessed from the peer-to-peer network that is a wireless ad hoc network over which the user device and the one or more peer devices communicate independent of the WLAN.

Clause 16. The method of any of clauses 14 to 15, wherein the method further comprises establishing the peer-to-peer network, and establishing the peer-to-peer network includes: searching a second user device in radio range of the user device; determining that the second user device is running the client software; and joining the second user device to the peer-to-peer network.

Clause 17. The method of clause 16, wherein the WLAN is a secured network accessible to clients that are authorized to access the digital content, and establishing the peer-to-peer network further includes determining that the second user device is connected to the WLAN before the second user device is joined to the peer-to-peer network.

Clause 18. The method of clause 16 or clause 17, wherein establishing the peer-to-peer network further includes joining any third user device to the peer-to-peer network that is or moves into radio range of the user device and that is running the client software.

Clause 19. The method of any of clauses 16 to 18, wherein establishing the peer-to-peer network further includes removing the second user device from the peer-to-peer network when the second user device moves out of radio range of the user device or stops running the client software.

Clause 20. The method of any of clauses 14 to 19, wherein the user device has a local copy of the digital content when the request is received, and accessing the digital content further includes: requesting information from the server computer that indicates a most-current version of the digital content that is available from the server computer; and determining that the local copy of the digital content is not the most-current version of the digital content.

Clause 21. The method of clause 20, wherein the digital content is also available from the peer device, and accessing the digital content further includes requesting information from the peer device that indicates a version of the digital content that is also available from the peer device, and wherein the digital content is accessed from the peer device when the version of the digital content is a latest-version of the digital content, and from the server computer when the version of the digital content is not the latest-version of the digital content.

Clause 22. The method of any of clauses 14 to 21, wherein the user device has a local copy of the digital content when the request is received, the digital content is also available from the peer device, and accessing the digital content further includes: requesting information from the peer device that indicates a version of the digital content that is also available from the peer device; and determining that the version of the digital content is a more-current version of the digital content than the local copy of the digital content.

Clause 24. The method of any of clauses 14 to 22, wherein the WLAN is onboard a vehicle, and the user device and the one or more peer devices are user devices accessible to crew members of the vehicle.

Clause 24. The method of clause 24, wherein the vehicle is an aircraft, and the user devices include electronic flight bags (EFBs) accessible to flight crew of the aircraft.

Clause 25. A computer-readable storage medium for acquiring digital content by a user device connected to a wireless local area network (WLAN) that is connected to a wider-area network over which the digital content is accessible from a server computer, the computer-readable storage medium being non-transitory and having computer-readable program code stored therein that, in response to execution by processing circuitry, causes an apparatus to at least: receive a request for the digital content at the user device; perform a search of a peer-to-peer network that includes the user device and one or more peer devices running client software from which the peer-to-peer network is accessible, the search performed to determine if the digital content is also accessible from a peer device of the one or more peer devices; and access the digital content from the peer device over the peer-to-peer network and independent of the wider-area network when the search indicates the digital content is also accessible from the peer device, and from the server computer over the WLAN and the wider-area network when the search indicates the digital content is inaccessible from the peer device.

Clause 26. The computer-readable storage medium of clause 25, wherein the request is received from a user at a user interface of the client software running on user device, or automatically triggered by the client software running on user device.

Clause 27. The computer-readable storage medium of clause 25 or clause 26, wherein the digital content is accessed from the peer-to-peer network that is a wireless ad hoc network over which the user device and the one or more peer devices communicate independent of the WLAN.

Clause 28. The computer-readable storage medium of any of clauses 25 to 27, wherein the computer-readable storage medium has further computer-readable program code stored therein that, in response to execution by the processing circuitry, causes the apparatus to further establish the peer-to-peer network, and establishing the peer-to-peer network includes: search a second user device in radio range of the user device; determine that the second user device is running the client software; and join the second user device to the peer-to-peer network.

Clause 29. The computer-readable storage medium of clause 28, wherein the WLAN is a secured network accessible to clients that are authorized to access the digital content, and establishing the peer-to-peer network further includes determining that the second user device is connected to the WLAN before the second user device is joined to the peer-to-peer network.

Clause 40. The computer-readable storage medium of clause 28 or clause 29, wherein establishing the peer-to-peer network further includes joining any third user device to the peer-to-peer network that is or moves into radio range of the user device and that is running the client software.

Clause 41. The computer-readable storage medium of any of clauses 28 to 40, wherein establishing the peer-to-peer network further includes removing the second user device from the peer-to-peer network when the second user device moves out of radio range of the user device or stops running the client software.

Clause 42. The computer-readable storage medium of any of clauses 25 to 41, wherein the user device has a local copy of the digital content when the request is received, and the apparatus caused to access the digital content further includes the apparatus caused to: request information from the server computer that indicates a most-current version of the digital content that is available from the server computer; and determine that the local copy of the digital content is not the most-current version of the digital content.

Clause 44. The computer-readable storage medium of clause 42, wherein the digital content is also available from the peer device, and the apparatus caused to access the digital content further includes the apparatus caused to request information from the peer device that indicates a version of the digital content that is also available from the peer device, and wherein the digital content is accessed from the peer device when the version of the digital content is a latest-version of the digital content, and from the server computer when the version of the digital content is not the latest-version of the digital content.

Clause 44. The computer-readable storage medium of any of clauses 25 to 44, wherein the user device has a local copy of the digital content when the request is received, the digital content is also available from the peer device, and the apparatus caused to access the digital content further includes the apparatus caused to: request information from the peer device that indicates a version of the digital content that is also available from the peer device; and determine that the version of the digital content is a more-current version of the digital content than the local copy of the digital content.

Clause 45. The computer-readable storage medium of any of clauses 25 to 44, wherein the WLAN is onboard a vehicle, and the user device and the one or more peer devices are user devices accessible to crew members of the vehicle.

Clause 46. The computer-readable storage medium of clause 45, wherein the vehicle is an aircraft, and the user devices include electronic flight bags (EFBs) accessible to flight crew of the aircraft.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for acquiring digital content by a user device connected to a wireless local area network (WLAN) that is connected to a wider-area network over which the digital content is accessible from a server computer, the apparatus comprising:
    a memory configured to store computer-readable program code; and
    processing circuitry configured to access the memory, and execute the computer-readable program code to cause the apparatus to at least:
        receive a request for the digital content at the user device;
        perform a search of a peer-to-peer network that includes the user device and one or more peer devices running client software from which the peer-to-peer network is accessible, the search performed to determine if the digital content is also accessible from a peer device of the one or more peer devices;
        request information from the peer device that indicates a version of the digital content that is also accessible from the peer device; and
        access the digital content from the peer device over the peer-to-peer network and independent of the wider-area network when the search indicates the digital content is also accessible from the peer device and when the version of the digital content that is also accessible from the peer device is a latest-version of the digital content, and from the server computer over the WLAN and the wider-area network when the search indicates the digital content is inaccessible from the peer device or when the version of the digital content is not the latest-version of the digital content.

2. The apparatus of claim 1, wherein the request is received from a user at a user interface of the client software running on the user device, or automatically triggered by the client software running on the user device.

3. The apparatus of claim 1, wherein the digital content is accessed from the peer-to-peer network that is a wireless ad hoc network over which the user device and the one or more peer devices communicate independent of the WLAN.

4. The apparatus of claim 1, wherein the processing circuitry is configured to execute the computer-readable program code to cause the apparatus to further establish the peer-to-peer network, and establishing the peer-to-peer network includes:
    search for a second user device that is in radio range of the user device;
    determine that the second user device is running the client software; and
    join the second user device to the peer-to-peer network.

5. The apparatus of claim 4, wherein the WLAN is a secured network accessible to clients that are authorized to access the digital content, and establishing the peer-to-peer network further includes determining that the second user device is connected to the WLAN before the second user device is joined to the peer-to-peer network.

6. The apparatus of claim 4, wherein establishing the peer-to-peer network further includes joining any third user device to the peer-to-peer network that is or moves into radio range of the user device and that is running the client software.

7. The apparatus of claim 4, wherein establishing the peer-to-peer network further includes removing the second user device from the peer-to-peer network when the second user device moves out of radio range of the user device or stops running the client software.

8. The apparatus of claim 1, wherein the user device has a local copy of the digital content when the request is received, and the apparatus caused to access the digital content further includes the apparatus caused to:
    request information from the server computer that indicates a most-current version of the digital content that is available from the server computer; and
    determine that the local copy of the digital content is not the most-current version of the digital content.

9. The apparatus of claim 8, wherein the digital content is also available from the peer device.

10. The apparatus of claim 1, wherein the user device has a local copy of the digital content when the request is received, the digital content is also available from the peer device, and the apparatus caused to access the digital content further includes the apparatus caused to:
    determine that the version of the digital content is a more-current version of the digital content than the local copy of the digital content.

11. A method of acquiring digital content by a user device connected to a wireless local area network (WLAN) that is connected to a wider-area network over which the digital content is accessible from a server computer, the method comprising:
    receiving a request for the digital content at the user device;
    performing a search of a peer-to-peer network that includes the user device and one or more peer devices running client software from which the peer-to-peer network is accessible, the search performed to determine if the digital content is also accessible from a peer device of the one or more peer devices;
    requesting information from the peer device that indicates a version of the digital content that is also accessible from the peer device; and
    accessing the digital content from the peer device over the peer-to-peer network and independent of the wider-area network when the search indicates the digital content is also accessible from the peer device and when the version of the digital content that is also accessible from the peer device is a latest-version of the digital content, and from the server computer over the WLAN and the wider-area network when the search indicates the digital content is inaccessible from the peer device or when the version of the digital content is not the latest-version of the digital content.

12. The method of claim 11, wherein the request is received from a user at a user interface of the client software running on the user device, or automatically triggered by the client software running on the user device.

13. The method of claim 11, wherein the digital content is accessed from the peer-to-peer network that is a wireless ad hoc network over which the user device and the one or more peer devices communicate independent of the WLAN.

14. The method of claim 11, wherein the method further comprises establishing the peer-to-peer network, and establishing the peer-to-peer network includes:
  searching for a second user device that is in radio range of the user device;
  determining that the second user device is running the client software; and
  joining the second user device to the peer-to-peer network.

15. The method of claim 14, wherein the WLAN is a secured network accessible to clients that are authorized to access the digital content, and establishing the peer-to-peer network further includes determining that the second user device is connected to the WLAN before the second user device is joined to the peer-to-peer network.

16. The method of claim 14, wherein establishing the peer-to-peer network further includes joining any third user device to the peer-to-peer network that is or moves into radio range of the user device and that is running the client software.

17. The method of claim 14, wherein establishing the peer-to-peer network further includes removing the second user device from the peer-to-peer network when the second user device moves out of radio range of the user device or stops running the client software.

18. The method of claim 11, wherein the user device has a local copy of the digital content when the request is received, and accessing the digital content further includes:
  requesting information from the server computer that indicates a most-current version of the digital content that is available from the server computer; and
  determining that the local copy of the digital content is not the most-current version of the digital content.

19. The method of claim 18, wherein the digital content is also available from the peer device.

20. The method of claim 11, wherein the user device has a local copy of the digital content when the request is received, the digital content is also available from the peer device, and accessing the digital content further includes:
  determining that the version of the digital content is a more-current version of the digital content than the local copy of the digital content.

21. A computer-readable storage medium for acquiring digital content by a user device connected to a wireless local area network (WLAN) that is connected to a wider-area network over which the digital content is accessible from a server computer, the computer-readable storage medium being non-transitory and having computer-readable program code stored therein that, in response to execution by processing circuitry, causes an apparatus to at least:
  receive a request for the digital content at the user device;
  perform a search of a peer-to-peer network that includes the user device and one or more peer devices running client software from which the peer-to-peer network is accessible, the search performed to determine if the digital content is also accessible from a peer device of the one or more peer devices;
  request information from the peer device that indicates a version of the digital content that is also accessible from the peer device; and
  access the digital content from the peer device over the peer-to-peer network and independent of the wider-area network when the search indicates the digital content is also accessible from the peer device and when the version of the digital content that is also accessible from the peer device is a latest-version of the digital content, and from the server computer over the WLAN and the wider-area network when the search indicates the digital content is inaccessible from the peer device or when the version of the digital content is not the latest-version of the digital content.

\* \* \* \* \*